United States Patent
Chu

(10) Patent No.: US 10,742,680 B2
(45) Date of Patent: Aug. 11, 2020

(54) METHOD OF INDUSTRIAL DATA COMMUNICATION WITH DEDICATED PHYSICAL CHANNEL ISOLATION AND A SYSTEM APPLYING THE METHOD

(71) Applicant: OPTIMAL PROCESS CONTROL TECHNOLOGIES CO., LTD., Xiamen (CN)

(72) Inventor: Danlei Chu, Xiamen (CN)

(73) Assignee: OPTIMAL PROCESS CONTROL TECHNOLOGIES CO., LTD., Xiamen (CN)

( * ) Notice: Subject to any disclaimer, the term of this patent is extended or adjusted under 35 U.S.C. 154(b) by 251 days.

(21) Appl. No.: 15/878,177

(22) Filed: Jan. 23, 2018

(65) Prior Publication Data

US 2018/0337948 A1 Nov. 22, 2018

(30) Foreign Application Priority Data

May 17, 2017 (CN) .......................... 2017 1 0347530

(51) Int. Cl.
  *H04L 29/06* (2006.01)
  *H04L 29/08* (2006.01)
  *H04L 29/14* (2006.01)

(52) U.S. Cl.
  CPC .......... *H04L 63/18* (2013.01); *H04L 63/0209* (2013.01); *H04L 63/0428* (2013.01);
  (Continued)

(58) Field of Classification Search
  CPC ..... H04L 63/18; H04L 63/0209; H04L 69/08; H04L 63/0428; H04L 67/10;
  (Continued)

(56) References Cited

U.S. PATENT DOCUMENTS

| 6,889,385 | B1* | 5/2005 | Rakib | G08B 13/19656 |
| | | | | 348/E7.069 |
| 2002/0080938 | A1* | 6/2002 | Alexander, III | H04L 41/22 |
| | | | | 379/106.01 |

(Continued)

FOREIGN PATENT DOCUMENTS

CN 103036886 A 4/2013

OTHER PUBLICATIONS

Ascorti et al., "Cloud-based wirelesshart networking for critical industrial monitoring and control", 12th IEEE International Conference on Industrial Informatics (INDIN), Date of Conference: Jul. 27-30, 2014.*

*Primary Examiner* — Morshed Mehedi
(74) *Attorney, Agent, or Firm* — Cooper Legal Group, LLC

(57) ABSTRACT

A method and a system of industrial data communication with dedicated physical isolation are provided that, the data collector and the physical isolator cooperate with each other. The data collector collects the data of each nodes of an enterprise by the intranet or by the wired and wireless communication module. The data is converted into encrypted messages under a protocol. The physical isolator secondarily encrypts the data and uploads the standardized data to a cloud platform via the internet. The data is exchanged between the data collector and the physical isolator by a dedicated data channel. The data transmitted in the dedicated data channel is encrypted by an algorithm, and is transmitted in a form of encrypted messages. Two ports of the dedicated data channel can only transmit the data in the form of encrypted messages. The dedicated data channel uses specific communication media, and forms physical isolation directly.

10 Claims, 3 Drawing Sheets

(52) U.S. Cl.
CPC ............ *H04L 63/123* (2013.01); *H04L 67/10* (2013.01); *H04L 69/08* (2013.01); *H04L 69/18* (2013.01); *H04L 69/40* (2013.01)

(58) Field of Classification Search
CPC ....... H04L 63/123; H04L 69/18; H04L 69/40; H04L 63/0478; G08C 17/02
See application file for complete search history.

(56) References Cited

U.S. PATENT DOCUMENTS

| | | | |
|---|---|---|---|
| 2003/0218549 A1* | 11/2003 | Logvinov | H04B 3/542 340/870.07 |
| 2005/0108523 A1* | 5/2005 | West | H04L 63/0428 713/165 |
| 2012/0221626 A1* | 8/2012 | Ferris | H04L 67/325 709/203 |
| 2015/0223273 A1* | 8/2015 | Macdonald | G08C 17/02 370/252 |
| 2015/0281233 A1* | 10/2015 | Asenjo | G06F 21/44 726/7 |
| 2015/0326582 A1* | 11/2015 | Al-Khowaiter | H04L 67/1097 726/4 |
| 2016/0011921 A1* | 1/2016 | Rao | G06F 11/079 714/37 |
| 2016/0301778 A1* | 10/2016 | Gupta | H04L 67/10 |
| 2017/0034316 A1* | 2/2017 | Pei | H04B 3/54 |
| 2018/0041343 A1* | 2/2018 | Chen | H04L 9/0897 |
| 2018/0263495 A1* | 9/2018 | Cronin | A61B 5/024 |

* cited by examiner

METHOD OF INDUSTRIAL DATA COMMUNICATION WITH DEDICATED PHYSICAL CHANNEL ISOLATION AND A SYSTEM APPLYING THE METHOD

FIELD OF THE INVENTION

The present invention relates to industrial communication technology, particularly to a method of industrial data communication with physical channel isolation and a system applying the method.

BACKGROUND OF THE INVENTION

When the continuously penetration from internet technology into industrial field, requirement for uploading flow data to the internet and building a dedicated industrial cloud platform is growing. However, considering data security, the industrial enterprises only transmit management data or environmental data to the internet but not process real-time data.

In the present technology, a solution of sending the industrial flow data to the internet has not yet invented.

A method of protecting industrial control network is disclosed in the Chinese patent database with the application number 201210553196.8; the method comprises the steps:

(1) The industrial information system applies hierarchy system under the requirement of information security of industrial control network; the industrial information system is divided to three layers: an industrial control layer, a manufacturing execution layer and an operation management layer; data communicated in the industrial control layer applies security arrangement;

(2) according to the characters and the control scopes of the industrial control system, the industrial control layer is divided to different blocks, which are separated by firewalls, for message filtering and access controlling; the industrial communication protocol is checked and analyzed; illegal communication's real-time warnings, source confirming and history recording are performed to ensure real-time diagnosis of the network;

(3) data is communicated between the industrial control layer and the manufacturing execution layer safely in non-internet way by using a network isolator; the internal and external operation system of the network isolator are alternatively and asynchronously connected; potential communication of the manufacturing execution layer with the industrial control layer is cut down by impenetrability TCP connection technique combining with access control technique; the communication between the industrial control layer and the manufacturing execution layer is one-way isolated;

(4) the arrangement, management, analysis, warning and audit center of the industrial control layer are built by the industrial security management platform module; the firewalls and network isolation devices are configured and managed; the warning information of the network events are stored and retrieved and the warning are graded; the terminals in the white list are allowed to access; the industrial control protocol is analyzed and abnormal events are captured; potential risks are analyzed; virus, worms and illegal incursions are captured; these provide reliable basis for network troubleshooting, analyzing and safely auditing the industrial control system. Above mentioned solution is provided that data is communicated in non-internet way by a network isolation module between the industrial control layer and the manufacturing execution layer; the internal and external process systems of the security isolation module are asynchronously connected; potential communication from the manufacturing execution layer to the industrial control layer is cut down by the impenetrability TCP connection technique combining the access control technique so as to achieve one-way isolation between the industrial control layer and the manufacturing execution layer. This isolating method is complicated, even though both process systems are not connected synchronously, data attack cannot be prevented. As long as the system is connected to Ethernet, there is surely a matter of risk; for example, port scanning, invalid accessing, network monitoring and network attacking.

Furthermore, the industrial field commonly applies with hierarchy network topology construction, which comprises a device layer, an information layer, a control optimization layer and a management decision layer, as figured in FIG. 1. This construction is not accomplished at one stroke but a standard structure through a long developing history of the process control and industrial intelligence. Although the hierarchy construction realizes distributed information monitoring and controlling and it updates complicated and distributed manually controlling to a centralized computer monitoring and manual policing, the big hierarchy system is of high cost maintenance, high system upgrade bottleneck, limited performance, information isolated island and weak expansibility.

Traditional controlling center and monitor room is built in hierarchy mode, thereby it needs work space, software and hardware devices, SCADA/DCS software systems and professional operators; the initial investment and daily maintenance cost a large expenditure; in addition, some systems are idle for a long period after the controlling center is built that they do not perform their monitoring, resulting in a burden to the enterprise.

Existing known construction highly costs as it needs to build the site controllers (PLC/DDC) and the controlling center, to pay for the software and hardware, to arrange the monitoring software and redundant systems, to build professional team, to keep daily operation and maintenance, etc; the system upgrade bottleneck includes independence of the communication protocols of different factories, limited and bad stability and maintenance of the computing performance of the controllers; the limited performance mainly includes: limited communication efficiency between the layers, limited reliability and limited expansibility.

At the same time, the hierarchy construction is provided that the signal is uploaded in layers from the micro bottom layer (device layer) to the macro top layer (management decision layer), then the macro top layer sends operation commend to the bottom layer in layers. Signal collected from the site devices and uploaded to each higher layer needs data managing and logical judging. when the hardware devices increase, the working frequency of the bottom layer is higher, meaning that the decentralized controlling and logical processing are getting higher; the data magnitude of the top layer grows multiply. Large enterprises are able to build this huge and complicated hierarchy construction, but for small and micro enterprises, it is difficult.

SUMMARY OF THE INVENTION

The object of the present invention is to overcome the disadvantages of the existing known technology and to provide with method of industrial data communication with dedicated physical isolation and a system of industrial data communication with dedicated physical isolation to ensure data security; the cloud structure is easily built, low cost, of high performance and of convenient maintenance.

The technical proposal of the present invention is that:

A method of industrial data communication with dedicated physical isolation, wherein a data collector is connected to internal information system through intranet or is connected to site plants by a wired or wireless module for data acquisition, the data is then transmitted to a physical isolator, above physical isolator processes the data and uploads the data to a cloud platform; wherein the data collector transmits the data to the physical isolator by a dedicated data channel, which is not Ethernet but a data channel using specific communication media, the dedicated data channel does not support general internet protocols, such as telnet, TCP, FTP, Socket, etc; when the data collector collects the data of site plants by a wireless module, the data collector receives and transmits the data on specific frequency bands.

In another preferred embodiment, the data collector converts the data under different communication protocols to standardized data under unified protocol, then above standardized data under a unified protocol is encrypted and encapsulated into encrypted messages and transmitted to the physical isolator; the communication attribute of the data collector can be configured as an one-way transmission or two-way transmission as needed.

In another preferred embodiment, the physical isolator judges the validity of the received encrypted messages; if the data is valid, the standardized data is uploaded to cloud platform after secondary encryption; data communication with the cloud platform is only allowed through specific port.

In another preferred embodiment, the physical isolator sets rewritable attribute of each communication node and stipulates one-way communication or two-way communication for each communication node.

In another preferred embodiment, the data processed by the physical isolator is uploaded to the cloud platform by flat type control method; in detailed, a communication layer and a cloud service layer are provided; the cloud platform is arranged in the cloud service layer; the data collected by the data collector is transmitted to the physical isolator by the dedicated data channel for processing by the physical isolator and then uploaded to the cloud platform through the communication layer.

In another preferred embodiment, when the communication layer fails to communicate with the cloud service layer, the data collected by the data collector is temporarily stored in the communication layer; the stored data is sequentially transmitted to the cloud service layer after the communication between said communication layer and said cloud service layer recovers.

In another preferred embodiment, further comprising private clouds and backup clouds between the communication layer and the cloud service layer, both of which are redundantly deployed, between the communication layer and the cloud service layer; when a private cloud fails, the backup cloud is used for data processing.

In another preferred embodiment, further comprising a local processing module to communicate with the communication layer; when the communication layer fails to communicate with the cloud service layer or the cloud service layer fails, the local processing module is used for data buffering and processing.

A system of industrial data communication with dedicated physical isolation, for implementing the method of industrial data communication with dedicated physical isolation; the communication system comprises a data collector and a physical isolator, the data collector is connected to internal information system through intranet or is connected to site plants by a wired or wireless module, the physical isolator is communicated with a cloud platform; the data collector transmits the data to the physical isolator by a dedicated data channel, which is not Ethernet but a data channel using specific communication media, the dedicated data channel does not support general internet protocol; when the data collector collects the data of site plants by a wireless module, the data collector receives and transmits the data on specific frequency bands.

In another preferred embodiment, it further comprises a flat hierarchy control system, which comprises a communication layer and a cloud service layer; the communication layer is arranged with a communication module; the cloud platform is arranged on the cloud service layer; the communication module is connected to the physical isolator to send data to the cloud service layer; the data from the cloud service layer is returned to the internal information system or site plants through the communication layer.

The present invention has advantages as follows:

The present invention is provided that, the data collector and the physical isolator cooperate with each other; the data collector collects the data of each node (comprising the internal information system or the site plants) of the enterprises by the intranet or by the wired and wireless communication module; the data is converted into encrypted messages under a protocol; the physical isolator secondarily encrypts the data and uploads the standardized data to the cloud platform via the internet; the data is exchanged between the data collector and the physical isolator by a dedicated data channel.

Data transmitted in the dedicated data channel is encrypted by an algorithm, and is transmitted in a form of encrypted messages; two ports of the dedicated data channel can only transmit the data in the form of encrypted messages. The dedicated data channel uses specific communication media, which is not Ethernet, and forms physical isolation directly so as to prevent network intrusion from hackers and ensures that the dedicated data channel can only transmit specific encrypted message.

The data is uploaded to the cloud by the flat hierarchy control method and the system that can decrease the load to the traditional hierarchical construction. The system mainly comprises a communication layer and a cloud service layer; this construction separates data acquisition and logical controlling that the field does not need to arrange complicated logical processing units like PLC or DDC; the complicated logical processing are performed in the cloud; the construction is easily built, reasonable cost, of lower system upgrade bottleneck, of efficient performance and of convenient maintenance; the enterprises can build their own monitoring and controlling system, thereby achieving popularization of the informatization and intellectualization in industrial field.

The flat hierarchy control method and system move the information of traditional controlling center to the cloud; the cloud source is a source rather than a product; the traditional controlling center based on products marketing and project implementing, is transferred to a mobile controlling center based on cloud source and cloud service, so the user can decrease the cost and make profit at the same time.

The users can choose the cloud source in modularization way, namely choosing the function modules as needed to build their own mobile controlling center; therefore the complicated basic construction is transferred to the user directly choosing the cloud source; users can also get the construction of the cloud service by remote PC, hand phone, pad or any packable mobile terminals.

This mobile controlling center with modularization and source servicing shortens the periods of developing, new building and improving; and the users can choose the function modules flexibly; the ultimate source service is trending to customized service, where no unnecessary function exists; this greatly reduces the resistance to the technology and the fund for the enterprises to implement informatization and intellectualization, particularly for small and micro enterprises.

The implement of the present invention has great significance in solutions for constructing an industrial cloud platform, analyzing industrial big data, constructing industrial system integral optimization and intellectualization, etc.

DETAILED DESCRIPTION OF THE EMBODIMENTS

The present invention will be further described in accordance with the drawings and the embodiments.

The object of the present invention is to solve the problem of existing known technology that the industrial data can not be safely uploaded to the cloud and the period of constructing the controlling network is long and the cost is high. The present invention is provided with a method of industrial data communication with dedicated physical isolation, in which the internal and external net are physically isolated by the dedicated data channel, and the data is uploaded to the cloud by a flat type construction; this prevents the internal information from network attacking and ensures data security. The construction is easy to build and costs low.

Figure 1:
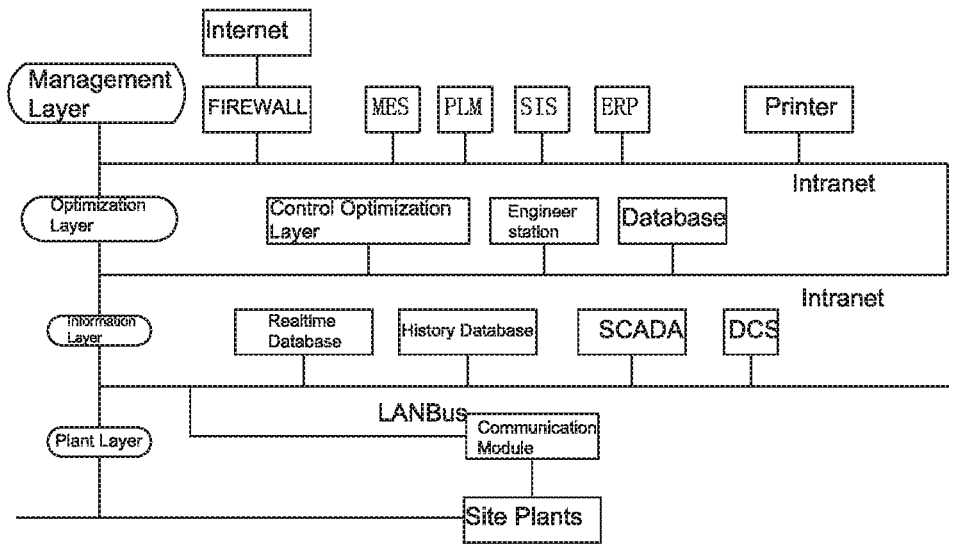
FIG. 1 illustrates a schematic diagram of a hierarchy network topology construction of existing known technology.
Figure 2:
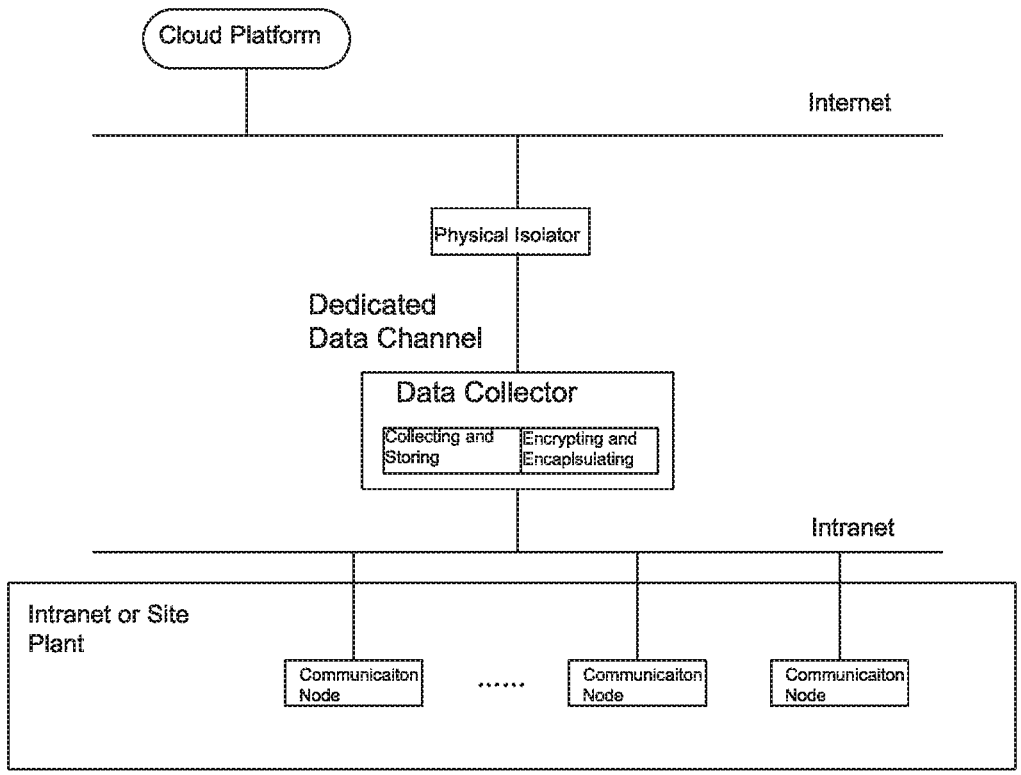
FIG. 2 illustrates a schematic diagram of a system of the present invention.
Figure 3:
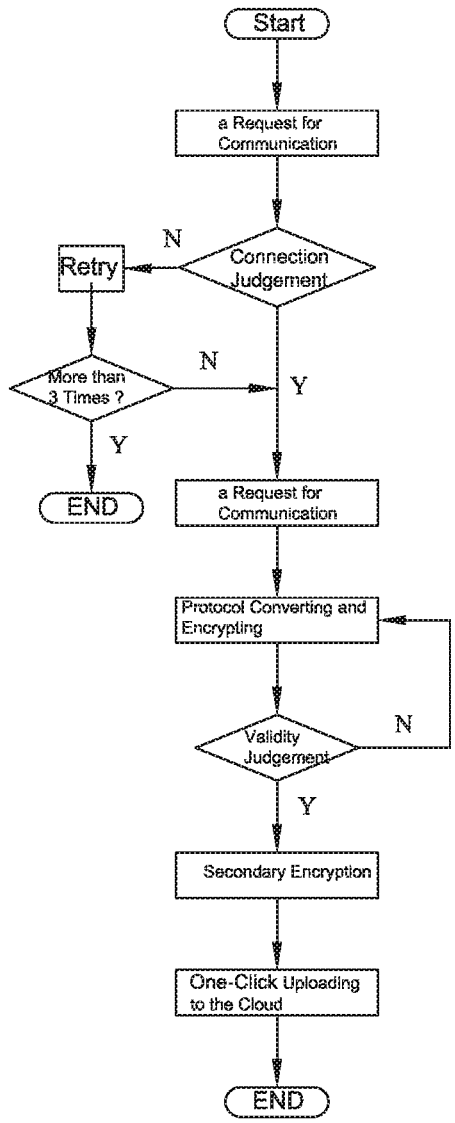
FIG. 3 illustrates a flow diagram of a method of the present invention.

As figured in FIG. 2 and FIG. 3, the method of industrial data communication with physical channel isolation is provided that, when the enterprises is configured with an internal information system, the data collector is connected to the internal information system (like SCADA, DCS, MES, SIS, etc) of the enterprise through an intranet; or if the site plants are not connected to form an internal information system, the site plants are connected to the data collector by wired or wireless communication module for data acquisition; the collected data is then transmitted to the physical isolator by the dedicated data channel, and the data isolator processes the data and then uploads the data to the cloud platform. The data collector sends the data to the physical isolator by dedicated data channel, which is not Ethernet, using specific communication media; the dedicated data channel does not support general internet protocols; when the data collector collets data of site plants by wireless module, the data receives and transmits on specific frequency bands.

The present invention provides with a system of industrial data communication with dedicated physical isolation to implement the method above mentioned; the system comprises the data collector and the physical isolator; the data collector is connected to internal information system through an intranet or is connected to site plants by wired or wireless module; the physical isolator is communicated with the cloud platform; the data collector transmits the data to the physical isolator by the dedicated data channel, which is not Ethernet, using specific communication media, the dedicated data channel does not support general internet protocols; when the data collector collets data of site plants by wireless module, the data receives and transmits on specific frequency bands.

As different internal information systems and different site plants use different communication protocols, in the present invention, the data collector is used to collect and summarize the data and encrypts the data and transmits the data to the physical isolator. The data collector converts the data under different communication protocols to standardized data under an unified protocol first; then the data is summarized and stored in the database, and then the standardized data is encrypted and encapsulated after protocol conversion, finally the encrypted data is converted under costumed encrypting (encrypted in the communication layer) protocol and encapsulated to encrypted message, the encrypted message is then transmitted to the physical isolator.

The communication attribute of the data collector can be configured as an one-way transmission or two-way transmission as needed. In a highly security sensitive industry, the communication attribute of the data collector is configured as an one-way transmission when the data collector transmits data to the physical isolator; in a low security sensitive industry, the communication attribute of the data collector is configured as a two-way transmission.

Data exchanges between the physical isolator and the data collector by the dedicated data channel; the exchange process is that, the physical isolator analyzes and checks the received encrypted message to judge the data validity; if the data is invalid, the invalid information is resent to the data collector; if the data is valid, the encrypted message is secondarily encrypted and uploaded to the cloud platform. The transmission, analyzing and checking steps repeat. At the same time, the valid data is secondarily encrypted by the physical isolator (encrypted in the network layer, which can be DES, AES, etc), and then the physical isolator is communicated with the internet to upload the internal information system or the site process data to the cloud platform.

The flow of the method of this embodiment is that:

when a communication requests, determining whether the line is connected or not; if the line is not yet connected, retrying the request; if the request reaches to a certain amount of times, the communication ends; if the line is connected, the communication is established. Then the data collector converts and encrypts the data, and transmits the encrypted data to the physical isolator. The physical isolator judges the validity of the data; if the data is invalid, returning to the prior step; if the data is valid, the data is secondarily encrypted. Finally, a configured button for one-click uploading is used to upload the data to the cloud platform.

The data communication protocol between the data collector and the physical isolator is not limited to a specific protocol but a costumed encryption communication protocol. The costumed encryption communication protocol is a costumed encryption protocol in the communication layer to encode and encapsulate the serial communication.

When the physical isolator secondarily encrypts the valid data, a firewall is set that data is only allowed to communicate with the cloud platform through a specific port. The specific port reflects on the website address, for example, http://10.10.1.2:10002, in which 10002 is a port number.

The data collector and the physical isolator can be but not limited to: dedicated server, IPC, server, PLC board or dedicated embedded computer system.

The data collector is configured with protocol converting module to convert the communication protocols. The protocol converting module can be viewed as a protocol converting base, which converts the communication protocols (like OPC, Modbus, UDP, BacNet, CCN) the internal information system or site plants support to encrypted message (the converting uses software code, a converting means connecting each protocols to read and encapsulate the data); the encrypted message is then transmitted to the physical isolator by the dedicated data channel. At the same time, the protocol converting module is wide open, providing secondarily developing standardized interfaces for expanding the protocol converting base.

The physical isolator is configured with a data publishing module for receiving the encrypted message from the data collector and encoding and uploading the message to the cloud platform under a standardized communication protocol so as to realize data uploading and data collecting. To improve the universality of the physical isolator, the data publishing module publishes the data under a standardized protocol, preferred is TCP/IP. In addition, in the data publishing terminal, user can freely set rewritable attribute of each communication node to determine one-way transmission or two-way transmission for each communication node. The rewritable means that the communication is one-way or two-way; one-way communication means that the data is only allowed to read but not writable, two-way communication means that the data is allowed to read and writable.

Dedicated data channel is a data channel using specific communication media, which is not Ethernet. To ensure data security, the communication between the data collector and the physical isolator uses dedicated communication media, such as RS232/485 or dedicated RF (radio frequency) wireless channel. As these communication medias do not support all network communication protocol (TCP/IP, UDP, Telnet, FTP, etc), they are not limited, only if they are not Ethernet. Therefore, no port scanning, invalid accessing, network monitoring or network attacking exists.

The site data is isolated physically that avoids network attack from the source and ensures tight industrial data security when uploaded to the cloud.

Figure 4:
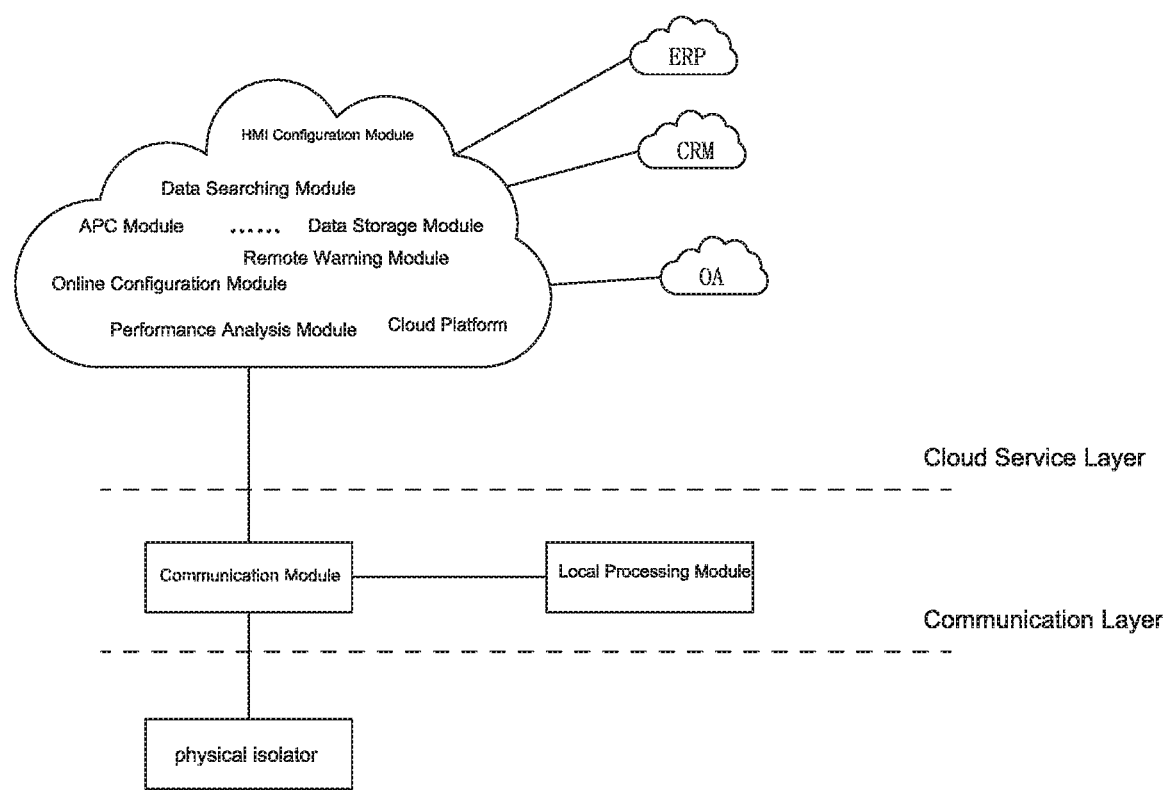
FIG. 4 illustrates a schematic diagram of a flat type network topology construction.

A flat type control method is provide in the present invention to upload the data processed by the physical isolator to the cloud platform; in detailed, a communication layer and a cloud service layer are configured; the cloud platform is arranged on the cloud service layer; the physical isolator transmits the data to the physical isolator, then the data is processed by the physical isolator and uploaded to the cloud platform through the communication layer. The cloud platform is configured with modularized sub-units with different functions; the specific modularized sub-unit processes the data as requested; then the result is resent to the internal information system or the site plants. As figured in FIG. 4, the flat type control system mainly comprises two layers, data of the site plants does not need to upload to the SCADA through data acquisition logical controlling module like PLC and DDC; at the same time, the site does not configure any monitoring software like SCADA nor supporting hardware devices; high-cost site controlling centers are not needed. The standardized data published by the physical isolator is uploaded to the cloud service layer directly from the communication layer without any processing; the modularized sub-unit of the cloud service layer remote manages, controls, mines and analyzes the data as user's requirement.

The present invention is provided with a flat type control system in accordance with above mentioned flat type control method; the flat type control system comprises a communication layer and a cloud service layer; the communication layer is arranged with a communication module; the cloud platform is arranged on the cloud service layer; the communication module is connected to the physical isolator to transmit the standardized data to the cloud service layer; the data sent by the cloud service layer is resent to the intranet or site plants through the communication layer. In this embodiment, the communication module comprises a wireless transmitting and receiving module, a relay module and an intelligent IO module.

In the present invention, the user costumes a plurality of modularized sub-units of the cloud service layer to form a mobile controlling center system for users; the remote devices are connected to the mobile controlling center for interacting. The mobile controlling center system arranges existing logical control modules like PLC/DDC, monitoring software like SCADA and backstage data mining/analyzing software to the cloud service layer to form cloud source, which is on top for users through remote computers or mobile terminals.

If a third-party system like enterprise OA system (Office Automation), ERP (Enterprise Resource Planning) system, CRM (Customer Relationship Management) system wants to combine the data of the intranet or the data collected from site plants, it can get the data through an open interface of the cloud service layer, that is to say, the platform is configured with open interfaces, through which a third-party system can get the data of intranet or the data collected from the site plants.

In this embodiment, the mobile controlling center system can accomplish APC (Advanced Process Control) cloud online optimizing and adjusting, HMI online configuring, remote warning, fault diagnosing, and other MES (Management and Execution System) and ERP functions, for example, online employee's schedule, duty, exchange, dispatching, maintenance and visitor record, thereby improving the work efficiency. Accordingly, the cloud platform is configured with different modularization sub-units with different functions, like APC module, online configuration module, performance analysis module, HMI arrangement module, data storage module, data searching module, remote warning module, etc.

Most industrial enterprises can only accomplish informatization improvement, but they cannot put the intelligential industrial construction to the earth. In a sense, this is a monitoring process but not a controlling process. APC optimized controlling combines high-level identifying and APC control optimized computing to realize optimized system controlling. APC technology replaces manual work to follow and optimize the user control system, and feedback adjusted parameters through the cloud to the site in real-time; this makes the sites and control systems work in a best performance and a lowest assumption. This intelligential operation process not only reduces complicated manually operation and adjusting, but also lowers the requirement to technicians' theory background.

In the present invention, the cloud service layer is configured with an APC module to optimize the devices by APC control optimized computing, and to send the adjusted parameters to the intranet or the site plants through the communication layer so as to control the intranet or the site plants.

The mobile controlling center system of the present invention has data collecting and real-time monitoring functions; it can also analyze the data and dialog that whether the carbon emissions and energy consumption are reasonable or not, how much the reduction space is, the service life of the plants, and provide detailed solutions for energy saving and emission reducing so as to improve the manufacturing quantity and efficiency to the enterprise.

In the present invention, the cloud service layer is configured with a performance analysis module to analyze the time domain/frequency domain of the input/output signal data of the intranet or the site plants, to generate corresponding frequency response curve and cumulative energy spectrum, and to reflect the performance of the intranet or site plants. In detailed, the user chooses an input/output signal data of a specific plant, the module analyzes the time domain/frequency domain of the target system and generates corresponding frequency response curve and cumulative energy spectrum to reflect the performance of system. Particularly, according to the frequency domain analysis report, the user can straightly find out spaces for energy consumption or emission, KPI value variation trend of the plants, service life of the plants, etc. The performance analysis module provides a direct report of the system for the user to adjust or change overwork plants in time and optimize manufacturing process, thereby improving the manufacturing efficiency and the product quality.

With the HMI (Human Machine Interface), the data of the intranet or the site plants can be remote managed, mined and analyzed; the control policy of the manufacturing process can be adjusted in time, and fault information can be early warning. If the fault information reaches to a preset level, warning would be sent to a preset contact personnel. At the same time, the communication layer takes emergency protection measures; if a security warning is activated, the plant terminal executes the security commend immediately, thereby ensuring normally continuously site working in a suboptimal state.

This embodiment combines intelligent security control system and intelligent risk warning system; with the HMI human-computer interface, the data of the intranet or the site plants can be remote managed, mined and analyzed; the control policy of the manufacturing process can be adjusted, and fault information can be early warned during the manufacturing so as to ensure manufacturing security and high efficient working. At the same time, the platform provides text notification function, and user can upload their contacts to the platform; if the fault information reaches to a preset level, the user would receive notification text, thus ensuring timely maintenance.

In the present invention, the signal transmitting and receiving between the communication layer and the cloud service layer uses wired or wireless module; a security processing mechanism is configured to provide security for data uploading. This can be implemented by software and hardware.

If the data is communicated by a wireless module, the data is transmitted on a dynamic and specific frequency band. On one hand, independent frequency band can resist interference from other frequency band; on the other hand, a dynamic and specific frequency can avoid signal analysis, thus ensuring signal privacy.

If the data is communicated by a wired module, the data is transmitted through an industrial bus, including 485 and other site bus protocols. Compared with Ethernet/Internet, industrial bus communication can efficiently prevent alien attack, thus ensuring signal transmission security.

The data is encrypted and transmitted under a standard communication protocol, which is separated from other communication protocols, thus ensuring data security. for conveniently monitoring, the distributed site conditions need to reflect on the HMI of the controlling center, called configuration. An enterprise usually builds the HMI during configuring the control configuration/SCADA software so as to connect the site plants, thus realizing the communication between the site and the software. Once in monitoring state, the monitoring pictures can not be added, deleted or amended unless the monitor is turned off and reset. The present invention can achieve online configuration, which comprises online monitoring configuration and online functional module configuration. That is to say, in a continuously monitoring, the present invention can achieve monitoring configuration and functional module configuration; it can also receive the data flow of the cloud service layer about the configuration of the site plants and the modularized sub-units, and display the data flow on the monitoring interface; the configuration of the site plants and the modularized sub-units are independent, so the configuration and point connection of site plants can be made in the monitoring interface, including adding, deleting and amending the monitored site plants; in another case, the site plants can be functional costumed and then monitored.

In detailed, configuration monitoring means that in a continuously monitoring, the user can operate on the monitoring interface to achieve site plants configuration and point connection, and adding, deleting and amending the plants. This greatly improves work efficiency and is readily agreed by the user.

Online function module configuration means that the cloud source of the cloud service layer is modularized; if the general modularized sub-units can not satisfy the users' need, user can custom and select the sub-units when the cloud platform is normal. At the same time, the cloud platform provides interfaces for expanding; after the custom modularized sub-units are encapsulated, the sub-units are connected to the cloud platform online for user to select and use.

The communication layer concentrates on data acquisition, data relay and temporary storage; it does not includes control/optimized logical process. The communication layer is further configured with hardware redundancy/communication network redundant to ensure continuously serving and communicating.

To ensure completely uploading of the data in any situation, in the present invention, the communication layer is configured with a temporary storage function. If the communication layer can not communicate with the cloud service layer, like a network breakdown or an emergency, the data of the site plants is temporarily stored in the communication layer; the data temporarily stored is uploaded to the cloud service layer after the communication recovers. A local processing module is further configured to connect to the communication layer; if the communication layer fails to communicate with the cloud service layer or if the cloud service layer fails, the local processing module is used for data buffering and processing.

Private clouds and backup clouds are redundantly deployed in the cloud service layer; if the private cloud fails (due to typhoon day or local power-off) to process and store the data and the transmission is cut down, the backup public clouds are switched on for data processing, thus ensuring continuousness of the data.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A method of industrial data communication with dedicated physical isolation, comprising:
   collecting data by at least one data collector connected to an internal information system through an intranet or connected to plant site devices by a wired module or a wireless module,
   transmitting the data to at least one physical isolator by the at least one data collector through a dedicated data channel,
   processing the data by the at least one physical isolator,
   uploading the data to at least one cloud platform after processing the data by the at least one physical isolator, and
   returning the data from the at least one cloud platform to the internal information system or the plant site devices through a communication layer, wherein:
      the dedicated data channel is not Ethernet but uses specific communication media and does not support general internet protocols, and
      when the at least one data collector collects the data from the plant site devices by the wireless module; the at least one data collector receives and transmits the data on specific frequency bands.

2. The method of industrial data communication with dedicated physical isolation according to claim 1, further comprising:
   converting the data by the at least one data collector to first standardized data according to a unified protocol, and
   encrypting and encapsulating the first standardized data into encrypted messages, wherein:
      transmitting the data to the at least one physical isolator comprises transmitting the encrypted messages to the at least one physical isolator, and
      the at least one data collector is configured for one-way transmission or two-way transmission.

3. The method of industrial data communication with dedicated physical isolation according to claim 2, further comprising:
   executing a validity check of the encrypted messages by the at least one physical isolator, and
   when the encrypted messages are valid based upon the validity check: encrypting the first standardized data into a second standardized data, wherein:
      uploading the data to the at least one cloud platform comprises uploading the second standardized data to the at least one cloud platform only through one or more specific ports of the at least one physical isolator.

4. The method of industrial data communication with dedicated physical isolation according to claim 2, further comprising:
   setting a value of a rewritable attribute of each communication node of the internal information system or the plant site devices to one-way transmission or two-way transmission.

5. The method of industrial data communication with dedicated physical isolation according to claim 1, wherein:
   uploading the data to the at least one cloud platform comprises uploading the data to the at least one cloud platform by a flat type control method, and
   the flat type control method only comprises:
      communicating with a cloud service layer, in which the at least one cloud platform is arranged, by the communication layer, and
      uploading the data to the at least one cloud platform through the communication layer.

6. The method of industrial data communication with dedicated physical isolation according to claim 5, further comprising:
   when the communication layer fails to communicate with the cloud service layer, temporarily storing the data in the communication layer, and
   sequentially transmitting the data temporarily stored in the communication layer to the cloud service layer after communication between the communication layer and the cloud service layer is re-established.

7. The method of industrial data communication with dedicated physical isolation according to claim 5, further comprising:
   redundantly deploying, between the communication layer and the cloud service layer, a private cloud and a backup cloud, and
   when the private cloud fails, using the backup cloud for data processing.

8. The method of industrial data communication with dedicated physical isolation according to claim 5, further comprising:
   when the communication layer fails to communicate with the cloud service layer or when the cloud service layer fails, using at least one local processing module, in communication with the communication layer, for data buffering and processing.

9. A system of industrial data communication with dedicated physical isolation, comprising:
   at least one data collector,
   a dedicated data channel,
   at least one physical isolator,
   at least one cloud platform,
   a first processor for implementing the at least one data collector, and
   a second processor for implementing the at least one physical isolator, wherein:
      the at least one data collector is connected to an internal information system through an intranet or is connected to plant site devices by a wired module or a wireless module,
      the at least one physical isolator is in communication with the at least one cloud platform,
      the at least one data collector transmits data to the at least one physical isolator through the dedicated data channel,
      the at least one physical isolator uploads the data to the at least one cloud platform,
      the dedicated data channel is not Ethernet but uses specific communication media and does not support general internet protocol,
      the data is returned from the at least one cloud platform to the internal information system or the plant site devices, and
      when the at least one data collector is connected to the plant site devices by the wireless module and collects the data from the plant site devices, the at least one data collector receives and transmits the data on specific frequency bands.

10. The system of industrial data communication with dedicated physical isolation according to claim 9, further comprising:
- a flat hierarchy control system comprising, a communication layer and a cloud service layer, wherein:
  - at least one communication module is arranged on the communication layer,
  - the at least one cloud platform is arranged on the cloud service layer,
  - the at least one communication module is connected to the at least one physical isolator to send the data to the cloud service layer,
  - the internal information system or the plant site devices are connected to the communication layer for receiving the data from the at least one cloud platform, and
  - the data from the cloud service layer is returned to the internal information system or the plant site devices through the communication layer.

\* \* \* \* \*